US00RE35965E

United States Patent [19]

Cook

[11] E Patent Number: Re. 35,965

[45] Reissued Date of Patent: Nov. 24, 1998

[54] APPARATUS FOR FASTENING AND ADJUSTING A LINE

[76] Inventor: Peter Cook, 2930 NE. 19th St., Pompano Beach, Fla. 33062

[21] Appl. No.: 680,530

[22] Filed: Jul. 9, 1996

Related U.S. Patent Documents

Reissue of:

[64] Patent No.: 5,327,847
Issued: Jul. 12, 1994
Appl. No.: 61,448
Filed: May 14, 1993

U.S. Applications:

[63] Continuation-in-part of Ser. No. 970,619, Nov. 3, 1992, Pat. No. 5,327,845.

[51] Int. Cl.[6] ..... B63B 21/04

[52] U.S. Cl. ..... 114/218; 24/134 R

[58] Field of Search ..... 114/218, 219, 114/230, 221 R, 343; 24/115 R, 129 R, 130, 132 R, 133, 134 R, 132 AA

[56] References Cited

U.S. PATENT DOCUMENTS

| | | | |
|---|---|---|---|
| 248,367 | 11/1881 | Haft | D8/356 |
| 2,573,806 | 11/1951 | Paterson | 24/126 |
| 2,942,315 | 6/1960 | Johnson | 24/134 |
| 3,650,236 | 3/1972 | McFarlane | 114/218 |
| 3,678,876 | 7/1972 | Alter | 114/218 |
| 4,114,553 | 9/1978 | Zidek | 114/218 |
| 4,143,446 | 3/1979 | Down | 24/115 |
| 4,278,042 | 7/1981 | Lindquist | 114/218 |
| 4,324,193 | 4/1982 | Cutler | 114/199 |
| 4,660,493 | 4/1987 | Lowry, III | 114/218 |
| 4,887,337 | 12/1989 | Bateman | 24/136 |
| 4,895,094 | 1/1990 | Carlstedt | 114/218 |
| 4,993,123 | 2/1991 | Siwek | 24/136 |
| 4,998,495 | 3/1991 | Bos et al. | 114/218 |
| 5,008,981 | 4/1991 | Smithson | 24/49 |
| 5,068,949 | 12/1991 | Horace | 24/115 |

*Primary Examiner*—Stephen Avila
*Attorney, Agent, or Firm*—McCormick, Paulding & Huber

[57] ABSTRACT

An apparatus for fastening a line supporting a fender on a vessel has a body portion defining a first bore extending through the body portion for receiving the line, and a second bore spaced apart from the first bore and extending through the body portion for receiving the line after it is passed through the first bore and wrapped around a rail on the vessel. A handle portion is generally U-shaped for receiving the body portion between opposing sides of the handle portion and is slidable relative to the body portion. A drive arm is pivotally mounted on one end to the body portion, and is coupled on another end to the opposing sides of the handle portion. The drive arm defines a toothed surface and is spring biased for engaging the line extending through the second bore with the toothed surface to lock the line in place. The toothed surface of the drive arm is moved into and out of engagement with the line by moving the handle portion toward and away from the body portion.

40 Claims, 5 Drawing Sheets

APPARATUS FOR FASTENING AND ADJUSTING A LINE

Matter enclosed in heavy brackets [ ] appears in the original patent but forms no part of this reissue specification; matter printed in italics indicates the additions made by reissue.

CROSS-REFERENCE TO RELATED APPLICATION

This patent application is a continuation-in-part of U.S. patent application Ser. No. 07/970,619, filed Nov. 3, 1992, co-pending herewith *now U.S. Pat. No. 5,327,845.*

FIELD OF INVENTION

The present invention relates to fastening apparatus, and more particularly, to apparatus for fastening and adjusting lines, such as lines on marine vessels, which permit lines to be rapidly secured, released and/or adjusted.

BACKGROUND INFORMATION

There are various known devices for fastening and adjusting lines on marine vessels, and particularly for fastening and adjusting a line suspending a fender. A fender is a soft bumper, typically made from a rubber-like material, or another material for absorbing impact, which in some instances is inflated, and is suspended on a line over the side of a marine vessel in order to protect the vessel when docked or rafted next to another vessel. The fender line is typically tied to a rail extending along the deck on the side of the vessel or to a cleat on the deck.

One known device for securing a fender line to a rail is called the "FEND-R-CLIP", which is basically a single piece of sheet metal, in which one end is bent into a c-shaped clip for attachment to the rail, and which has an elongated aperture for receiving the line. The elongated aperture is circular on one end and tapers down to a narrow width on the other end, so that the line can be pulled down through the aperture, and fixed in place by being squeezed between the tapered surfaces of the aperture. Although this is an inexpensive device, the line is not always easily pulled through the circular part of the aperture, and when fixing the line in place by jamming the line between the tapered sides of the aperture, the line can become frayed.

Another known device is the BUMPER BUDDY®, manufactured by Idea Development Company of Issaquah, Wash. This device is made from a unitary piece of plastic, and includes a pair of c-shaped clip portions for attachment to a rail, and several apertures for running the line through the device, and a cleat portion for fixing the line in place after it is passed through the aperture. Although this device is relatively inexpensive to make, it is time-consuming to pass the line through the apertures and to then fix the line with the cleat portion. In addition, once the line is fixed in place, it is relatively difficult to adjust the position of the fender by pulling the line through the various apertures.

Another known device for supporting a fender is manufactured by NHS Marine Company in Florida, which has a plastic strap with a snapping lock mechanism for attachment of the strap to a rail. A metal portion defines a passageway for passing the line through the device, and a sliding metal roller with a knurled or ridged surface is seated within the passageway. As the line is pulled down through the passageway, the sliding metal roller is pulled down with the line so as to restrict the passageway and secure the line in place. The sliding metal roller can be difficult to manipulate, thus rendering adjustment of the fender line difficult too. The metal roller also tends to become jammed within the passageway, requiring the use of pliers or a similar tool to release the roller and the line.

It is an object of the present invention to provide an apparatus for rapidly and easily fastening, releasing, and adjusting a line, such as a line suspending a fender on a marine vessel, which overcomes the drawbacks and disadvantages of the prior art.

SUMMARY OF THE INVENTION

The present invention is directed to an apparatus for fastening lines, such as a line supporting a fender on a marine vessel. In one embodiment of the present invention, the apparatus comprises a body portion deeming at least one passageway extending through the body portion for receiving a line. A handle portion is coupled to the body portion and moveable relative to the body portion, and a drive arm is pivotally mounted on one end to the body portion and coupled on another end to the handle portion. The drive arm defines a line-engaging surface, and is normally biased toward the passageway to engage a line extending through the passageway. The drive arm is moveable between a first position located to one side of the passageway to permit movement of a line through the passageway in response to movement of the handle portion toward the body portion, and a second position at least approximately in the passageway to engage a line extending through the passageway upon movement of the handle portion away from the body portion.

In one embodiment of the present invention, the drive arm includes at least one drive surface, and the handle portion defines at least one elongated slot for receiving the drive surface for slidable movement of the drive surface through the elongated slot, in response to movement of the handle portion relative to the body portion to move the drive arm between the first and second positions. Preferably, the drive arm includes two drive surfaces located on opposite sides of the drive arm relative to each other, and the handle portion includes two elongated slots located on opposite sides of the handle portion relative to each other, wherein each elongated slot receives a respective drive surface.

In one embodiment of the present invention, the apparatus further comprises at least one spring member coupled between the drive arm and the body portion for normally biasing the drive arm toward the second position. A surface defining one of the passageways preferably defines a plurality of raised surface areas and corresponding depressed surface areas between the raised surface areas, for engaging a line extending through the passageway with the raised surface areas. The line-engaging surface of the drive arm also preferably defines a plurality of raised surface areas and corresponding depressed surface areas located between the raised surface areas, for engaging a line extending through the passageway with the raised surface areas. Preferably, each of the raised surface areas are pointed generally toward one end of the respective passageway to facilitate the ability of the raised surface areas to engage a line extending through the passageway, and thus lock the line in place within the passageway.

In another embodiment of the present invention, the apparatus comprises a body portion defining a first passageway extending through the body portion for receiving the line, and a second passageway spaced apart from the first passageway also extending through the body portion for receiving the line passed through the first passageway. A handle portion is coupled to the body portion, and a line-engaging portion is pivotally mounted to the body portion. The line-engaging portion is normally biased toward a first position into engagement with the line extending through the second passageway to fix the line in the second passageway, and moveable from the first position to a second position away from the second passageway to permit passage of the line through the second passageway upon movement of the handle portion toward the body portion.

In one embodiment of the present invention, the handle portion is integral with the line-engaging portion and is pivotally mounted to the body portion, and at least a portion of the second passageway is defined between the line-engaging portion and the body portion. Preferably, a biasing member is coupled between the handle portion and the body portion for normally biasing the line-engaging portion toward the first position.

Both the line-engaging portion and a surface defining the second passageway each preferably define a plurality of raised surface areas and corresponding depressed surface areas located between the raised surface areas, for engaging a line extending through the second passageway to fix the line in place with respect to the apparatus. Preferably, the raised surface areas are pointed generally toward one end of the second passageway to facilitate the ability of the apparatus to lock the line in place.

In another embodiment, the line-engaging portion includes at least one drive member, and the handle portion defines at least one elongated slot for receiving the drive member for slidable movement of the drive member through the elongated slot with movement of the line-engaging portion between the first and second positions.

In another embodiment of the present invention, the body portion includes a first part and a second part, and the second part defines a modular attachment component defining the first passageway. Preferably, at least one of the first part and the second part of the body portion defines a recess, and the other of the first part and the second part includes an elongated raised portion received within the recess for coupling the first part to the second part.

One advantage of the apparatus of the present invention, is that the apparatus can be used to rapidly and easily support and adjust a line suspending a fender on a marine vessel. Once the line is received through the passageways of the body portion, the handle portion can be manipulated to easily adjust the position of the line relative to the apparatus, and thus to adjust the position of the fender. For example, to raise the fender, the handle portion is simply squeezed toward the body portion, thus opening the passageway extending through the body portion, and the line can then be pulled through the passageway to raise the fender. To lower the fender, on the other hand, the body portion can then again be simply squeezed to open the passageway, and thus permit the fender to slowly descend under the force of gravity. When the fender reaches its desired location, the handle portion is released, thus permitting the drive arm to be rotated into engagement with the line extending through the passageway, to fix the line relative to the apparatus.

Other advantages of the apparatus of the present invention will become apparent in view of the following detailed description and accompanying drawings

DETAILED DESCRIPTION

Figure 1:
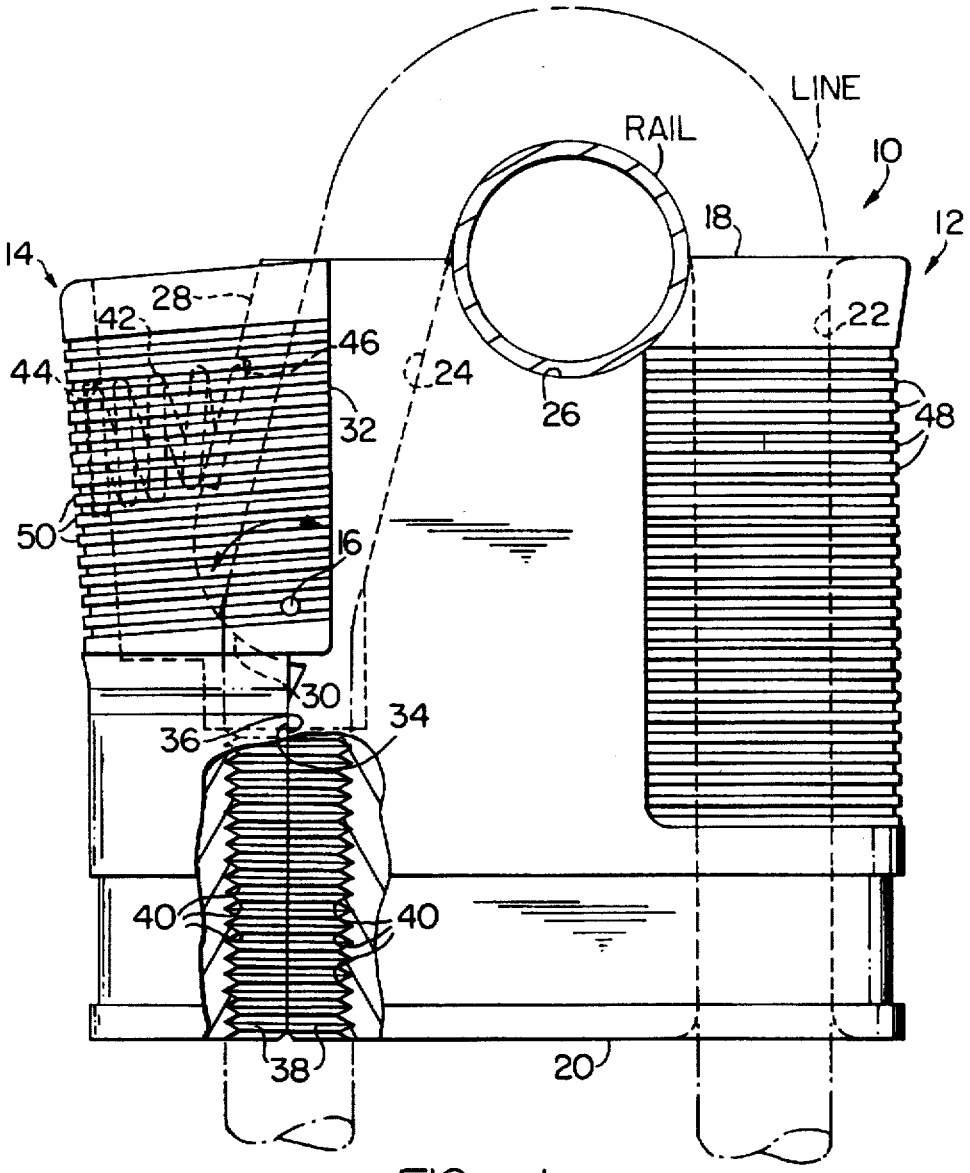
FIG. 1 is a side plan view, in partial cross-section, of an apparatus embodying the present invention for fastening and adjusting a line supporting a fender on a marine vessel.
Figure 3:
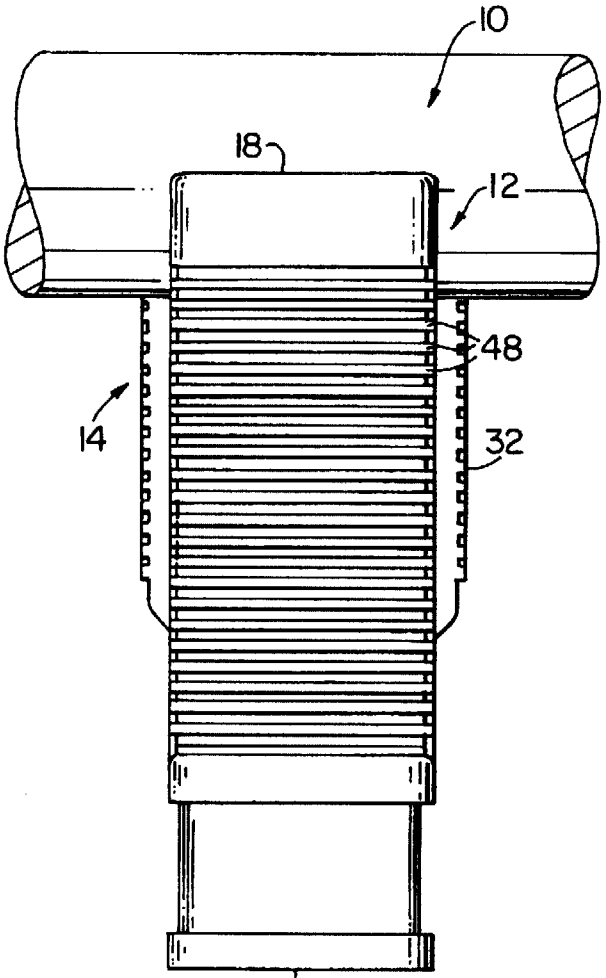
FIG. 3 is an end plan view of the apparatus of FIG. 1.
Figure 2:
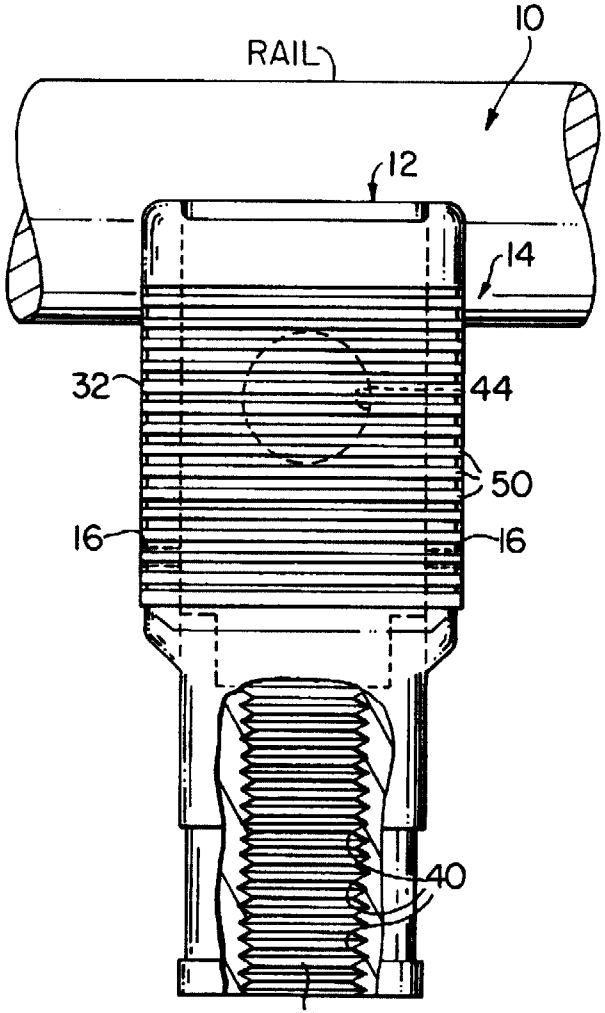
FIG. 2 is a front plan view of the apparatus of FIG. 1.

In FIGS. 1–3, an apparatus embodying the present invention for fastening and adjusting a line supporting a fender (not shown) is indicated generally by the reference numeral 10. The apparatus 10 includes a body portion 12 and a release lever or drive arm 14, which is pivotally coupled to the body portion 12 by means of a pivot pin 16. The body portion 12 includes a top surface 18 and a bottom surface 20, and a first bore 22 extending through one side of the body portion between the top and bottom surfaces. A second bore 24 extends through the top surface 18 on the other side of the body portion relative to the first bore 22, and a semicircular cut-out 26 is formed in the top surface 18 between the first and second bores 22 and 24, respectively. The semi-circular cut-out 26 is shaped to be seated against, and receive at least a portion of a rail on the vessel, as shown in FIG. 1.

The apparatus 10 is used to fasten and adjust a fender line (illustrated in dashed lines in FIGS. 1) by passing the free end of the line through the opening in the bottom surface 20 of the first bore 22, up through the first bore 22 and over the rail, and down into the opening in the second bore 24 in the top surface 18. A handle portion of the release lever or drive arm 14 is then squeezed toward the body portion, and the lever is pivoted about the pivot pin 16 to permit passage of the line between the release lever 14 and body portion 12. The handle portion of the lever 14 is then released to secure the line in place and support the fender from the rail seated within the cut-out 26, as is described further below.

As shown in FIG. 1, the edges defining the bore 22 in the top and bottom surfaces 18 and 20, respectively, are preferably either chamfered or formed with a smooth radius to facilitate insertion of the line and prevent fraying of the line as it is passed through the respective bore. The edges defining the second bore 24 in the top surface 18 and in the bottom surface 20 are likewise preferably formed in the same fashion to facilitate insertion and prevent fraying of the line.

As also shown in FIG. 1, the first bore 22 is substantially parallel with the longitudinal axis of the body portion 12, whereas the second bore 24 is oriented at an angle relative to the longitudinal axis, and tapers inwardly from about the mid-section of the body portion toward the top surface 18. In the embodiment of the present invention illustrated, the second bore 24 is oriented at an angle of approximately 15° relative to the longitudinal axis of the body portion.

As also shown in FIG. 1, the body portion 12 defines a sloped surface 28 (illustrated in dashed lines), which extends from the top surface 18 along one side of the body portion adjacent the second bore 24, and terminates in a curved section 30 (also illustrated in dashed lines) located approximately at the mid-section of the body portion 12. The slope of the surface 28 is approximately the same as that of the second bore 24, and the other end of the second bore 24 terminates in the curved section 30. As shown in FIG. 1, the surfaces 28 and 30 are received within a recess defined within a handle portion 32 of the lever 14, thus permitting the lever 14 to be pivoted about the pivot pin 16 relative to the body portion 12, as indicated by the arrow in FIG. 1.

The body portion 12 defines a substantially straight surface 34 extending between the curved section 30 and the bottom surface 20, and the lever 14 similarly defines a straight surface 36 facing the straight surface 34, as shown in FIG. 1. Both straight surfaces 34 and 36 each define a substantially semi-circular cut-out 38 extending along the length of the respective straight surface and oriented substantially parallel to the first bore 22. As can be seen, the surface of each cut-out 38 is defined by a plurality of teeth 40, which are used to secure the line in place when the lever 14 is in the normally closed position.

A coil spring 42 is seated between the handle portion 32 of the lever 14 and body portion 12, as shown in dashed lines in FIG. 1, which normally biases the lever 14 in the closed position. The handle portion 32 of the lever 14 defines a recess 44 on an inside surface for receiving one end of the spring 42, and the sloped surface 28 defines a recess 46 for receiving the other end of the spring 42, as also shown in dashed lines in FIG. 1. The spring 42 is thus secured in place between the recesses 44 and 46, normally biasing the handle portion 32 of the lever 14 away from the body portion 12, and in turn biasing the teeth 40 toward each other to engage the line passed between the lever and the body portion and secure the line in place.

As shown in FIG. 1, the body portion 12 includes a plurality of ribs 48 spaced apart form each other along one side of the body portion, and the lever 14 similarly includes a plurality of ribs 50 spaced apart from each other along the outside surface of the handle portion 32. The ribs 48 and 50 facilitate a user's ability to grip the apparatus between the fingers of a hand, and manipulate the lever 14 to secure and/or adjust a line, as is described below.

In the operation of the present invention, the apparatus 10 is used to support a fender (not shown) from a rail on the vessel, so that the fender can be easily adjusted to a desired location relative to the rail and vessel and secured in place. The free end of the line is passed through the first bore 22, from the bottom surface 20 up through the top surface 18, over the rail, and into the second bore 24. The user then squeezes the handle portion 32 of the lever 14 toward the body portion 12, preferably by gripping the ribs 48 and 50 with a hand, which in turn causes the straight surface 36 of the lever 14 to move away from the body portion 12, and open the passage between the lever and body portion to receive the line. Once the line is passed through, the user then can adjust the location of the fender and secure the line in place by simply manipulating the handle portion 32 of the lever 14 and/or by pulling the line through the apparatus.

For example, to raise the fender, the lever 14 can be opened to pull the teeth 40 away from each other, and the line is simply pulled through the bores 22 and 24 and over the rail until the fender reaches its desired setting. The line is then secured in place by simply releasing the handle portion 32 of the lever 14, causing the teeth 40 to engage the line and fix it in relation to the apparatus 10. The weight of the fender pulls the line extending through the first bore 22 taut so that the rail is received within the cut-out 26, thus securing the fender in place. The fender can then be lowered relative to the rail, by simply squeezing the handle portion 32 of the lever 14, thus permitting the fender to slowly descend under its own weight, as it pulls the line through the space between the teeth 40 and through the first and second bores 22 and 24, respectively. When the fender is lowered to its desired position, the user releases the handle portion 32 of the lever 14, thus permitting the spring 42 to normally bias the teeth 40 into engagement with the line to secure the line and fender in place. A [knot-is] *knot is* preferably tied in the free end of the line to prevent it from accidentally passing through the second bore 24 when the handle portion 32 is squeezed to open the lever 14.

As will be recognized by those skilled in the art, the size and/or spring constant of the spring 42 is selected depending on the desired force to be exerted on the line when seated between the teeth 40. In the embodiment of the present invention illustrated, the spring 42 is made of stainless steel wire to prevent corrosion, which is approximately 0.06 inch in diameter, and is wound into an open coil spring having an approximately 0.5 inch diameter. In this situation, the spring 42 exerts a sufficient force in order to secure the line in place under the weight of a fender. However, the spring does permit the line to be manually pulled through the second bore 24 and between the teeth 40 when the lever 14 is in the normally closed position. One advantage of this feature, is that with more durable lines, the line can simply be pulled from its free (or safety knotted) end down through the second bore 24 and between the teeth 40 while holding the apparatus in place, in order to raise the fender up toward the rail. Similarly, the line on the other side of the apparatus can be pulled downward, away from the bottom of the first bore of the apparatus in order to lower the fender. Once the user stops pulling the line, the force exerted by the spring 42 is sufficient to secure both the line and fender in place. Thus, the apparatus of the present invention provides a uniquely simple and expedient means for adjusting and securing a line supporting a fender on a marine vessel.

Another advantage of the apparatus of the present invention, is that once the free end of the line is pulled through the second bore 24 and between the teeth 40, both the lever 14 and line can be released and the apparatus will seat itself against the rail. In other words, the fender descends under the force of gravity, thus pulling the line through the first bore 22 and driving the apparatus 10 (which is secured to the line by the teeth 40) up and into engagement with the rail. Because the weight of the fender is pulling on the line, the cut-out 26 is pulled into engagement with the rail, thus receiving the rail and seating the apparatus in place.

Yet another advantageous feature of the apparatus of the present invention, is that the orientation of the second bore 24 is at an acute angle relative to the longitudinal axis of the apparatus, and thus relative to the cut-outs 38 and teeth 40. When the lever 14 is squeezed into the open position and the line is pulled through the second bore 24, the line is oriented generally in line with the second bore 24, and thus generally away from the teeth 40, avoiding substantial contact with the teeth, and preventing unnecessary fraying and binding of the line.

It is noted that it is not necessary to support the fender from a rail when employing the apparatus of the present invention. As will be recognized by those skilled in the art, the cut-out 26 is adapted to be seated against any circular-shaped structure, or structure dimensioned to fit within the cut-out. It may also be desirable to form the cut-out 26 in a different shape, which may better correspond to the shape of the structure against which the apparatus is to be seated. Indeed, it is only necessary that there by some type of fixture on the vessel to wrap the line around and which can support the weight of the fender, before securing the line in place with the apparatus of the present invention.

Figure 7:
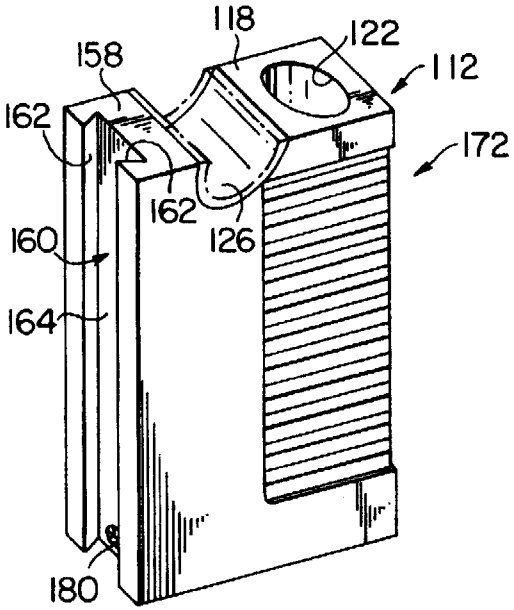
FIG. 7 is a perspective view of a modular rail attachment which can also be coupled to the lever assembly of FIG. 4 for fastening and adjusting a fender line supported on a rail on a marine vessel.
Figure 6:
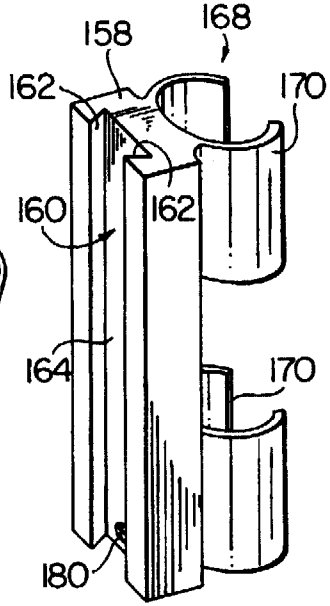
FIG. 6 is a perspective view of a modular pole attachment which can also be coupled to the lever assembly of FIG. 4 for attaching the apparatus to a pole or rod-shaped fixture on a marine vessel.
Figure 5:
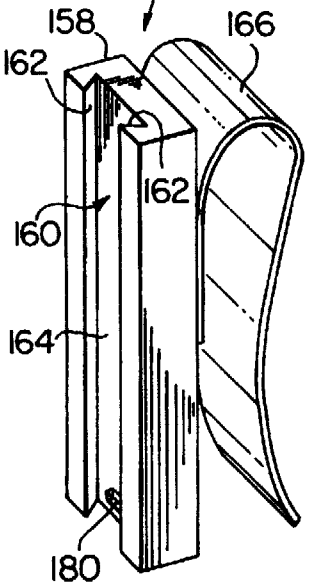
FIG. 5 is a perspective view of a modular clip attachment which is coupled to the lever assembly of FIG. 4 for attaching the apparatus to a fixture on a marine vessel, such as a windshield frame.

In FIGS. 4–7, another embodiment of the present invention is indicated generally by the reference numeral 110. This embodiment of the present invention is similar to the embodiment described above in connection with FIGS. 1–3, and therefore like reference numerals preceded by the numeral 1 are used to indicate like elements. The apparatus 110 differs from the apparatus 10 primarily by employing different modular components for attachment of the apparatus to different types of structures. FIG. 5 shows a modular clip attachment for attaching the apparatus 110 to a windshield frame, for example. FIG. 6, on the other hand, shows a modular pole attachment for attaching the apparatus 110 to a pole-shaped structure. And FIG. 7 shows a modular rail attachment, which permits attachment of the apparatus 110 to a rail, as described above in connection with FIGS. 1–3.

Figure 4:
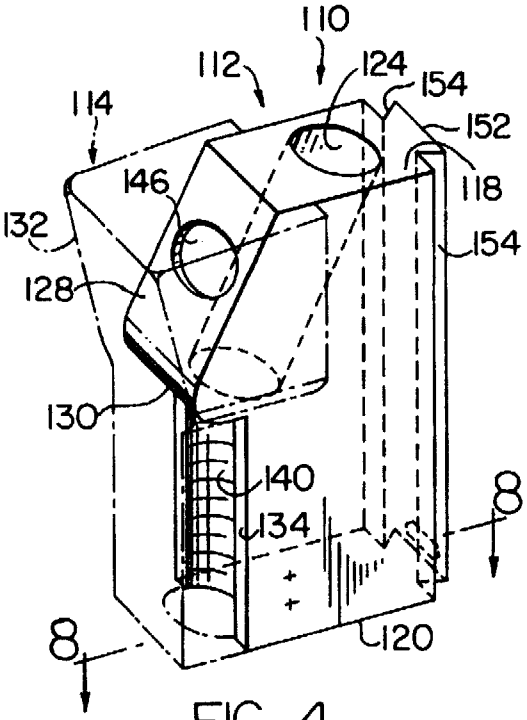
FIG. 4 is a perspective view of a lever assembly of another apparatus embodying the present invention for fastening and adjusting a line supporting a fender on a marine vessel.

Turning to FIG. 4, the apparatus 110 includes a body portion 112 which differs from the body portion 12 described above, in that it does not include the cut-out and first bore, but rather includes means for coupling the body portion 112 to a modular component, such as the modular components shown in FIGS. 5–7, for attachment to a fixture on a vessel, for example. Otherwise, the lever 114 (illustrated in dashed lines) and remaining portions of the body portion 112 (the spring 142 is not shown) are the same as described above in connection with the previous embodiment.

The means for coupling includes an elongated raised portion 152 extending along the side of the body portion 112 and oriented substantially parallel with the longitudinal axis of the apparatus. The raised portion 152 defines a pair of tapered surfaces 154 located on opposite sides of the raised portion relative to each other, and tapering inward toward the body portion 112.

Turning to FIG. 5, the modular clip attachment is indicated generally by the reference numeral 156, and includes a body portion 158 defining an elongated recess 160 for receiving the elongated raised portion 152, in order to attach the modular component 156 to the apparatus 110. The recess 160 is defined by a pair of tapered walls 162, each tapering in the same direction, and at approximately the same angle as a respective tapered wall 154 on the elongated raised portion 152, and a substantially flat wall 164 extending between the tapered walls 162. The modular component 156 is coupled to the body portion 112 by inserting and sliding the elongated raised portion 152 into the recess 160, which is secured in place within the recess by cooperation of the tapered walls 154 and 162. As shown in FIG. 5, a flexible clip 166 is coupled to the other side of the modular body portion 158 for attaching the apparatus to any suitable structure, such as a windshield frame or a life-line on a marine vessel.

The apparatus 110 employed with the modular clip attachment 156 can similarly be used to secure and adjust a fender line on a vessel. In this instance, the handle portion 132 of the lever 114 is squeezed toward the body portion 112, and the free end of the line is passed through the space between the teeth 140 and the bore 124. When the handle portion 132 of the lever 114 is released, the teeth 140 are biased into engagement with the line by the spring 142 (not shown), and the apparatus is fixed to the line. The clip 166 is then secured to any suitable structure on the vessel, such as a windshield frame. The position of the fender can then be adjusted by manipulating the lever and/or pulling the line through the apparatus as described above.

Turning to FIG. 6, the modular pole attachment is indicated generally by the reference numeral 168, and differs from the modular clip attachment 156 in that it includes a pair of flexible c-shaped clips 170 coupled to one side of the modular body portion 158, instead of the clip 166. The c-shaped clips 170 are particularly suitable for attachment to a pole or rod-shaped structure. As will be recognized by those skilled in the art, numerous types of attachment mechanisms can be incorporated into the modular attachment component of the present invention for attaching the apparatus to any type of structure.

In FIG. 7, the modular rail attachment is indicated generally by the reference numeral 172, and includes the same body portion 158 with recess 160 and tapered surfaces 162 for modular attachment. The modular rail attachment 172 also includes a first bore 122 and a semi-circular cut-out 126, thus enabling attachment of the apparatus 110 to a rail as described above. Accordingly, by attaching the modular rail attachment 172 to the apparatus 110, it has all of the same [20] features as the apparatus described in connection with FIGS. 1–3.

Figure 8:
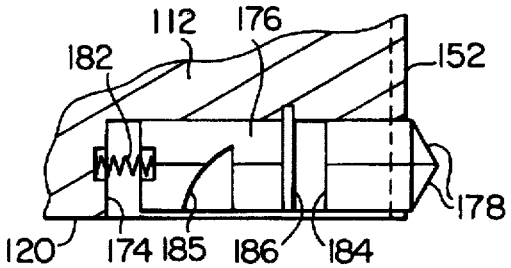
FIG. 8 is a partial cross-sectional view of the apparatus of FIG. 4 taken along the line 8—8 of FIG. 4, illustrating the plunger mechanism for locking a modular attachment to the apparatus.

The apparatus 110 also includes means for locking any of the various modular components to the apparatus, as shown in detail in FIG. 8. The body portion 112 defines a chamber 174 adjacent the bottom wall 120, which receives a spring-loaded plunger 176. The free end of the plunger 176 projects through an aperture in the elongated raised portion 152, and defines a pair of tapered surfaces 178 on its tip. As can be seen, each surface 178 tapers outward from the center of the plunger 176, and is shaped to be received within a corresponding recess 180 formed within the base wall 164 in each modular attachment (see FIGS. 5–7). A spring 182 is seated between the plunger 176 and the wall defining the chamber 174 to bias the plunger into engagement with the corresponding recess 180 in each respective modular attachment. An aperture 184 is formed through the plunger 176, and a pin member 186 extends through the aperture 184 and is coupled to the wall of the chamber 174. As can be seen, the width of the aperture 184 defines the degree to which the plunger can move in response to the force of the spring 182.

In the operation of the locking mechanism, when the elongated raised portion is inserted into the recess 160 of a respective modular attachment, the base wall 164 of the recess slides against the tapered wall 178 of the plunger 176, and forces the plunger to retract into the chamber 174. Then, when the recess 180 is moved into alignment with the plunger, the spring 182 is permitted to drive the plunger outward and seat the tapered surfaces 178 into engagement within the recess 180. This action generates a clicking sound, signalling to the user that the modular attachment is secured in place. The plunger 176 also prevents separation of the modular attachment from the body portion 112 during use, requiring a certain threshold force in order to dislodge the plunger 176 from the recess 180. Of course, the characteristics of the spring and plunger can be selected to control the magnitude of the force required to dislodge the plunger from the recess. A finger recess 185 is defined within the bottom surface of the plunger 176 in order to receive a user's finger to retract the plunger into the chamber 174, and release the modular attachment.

Figure 9:
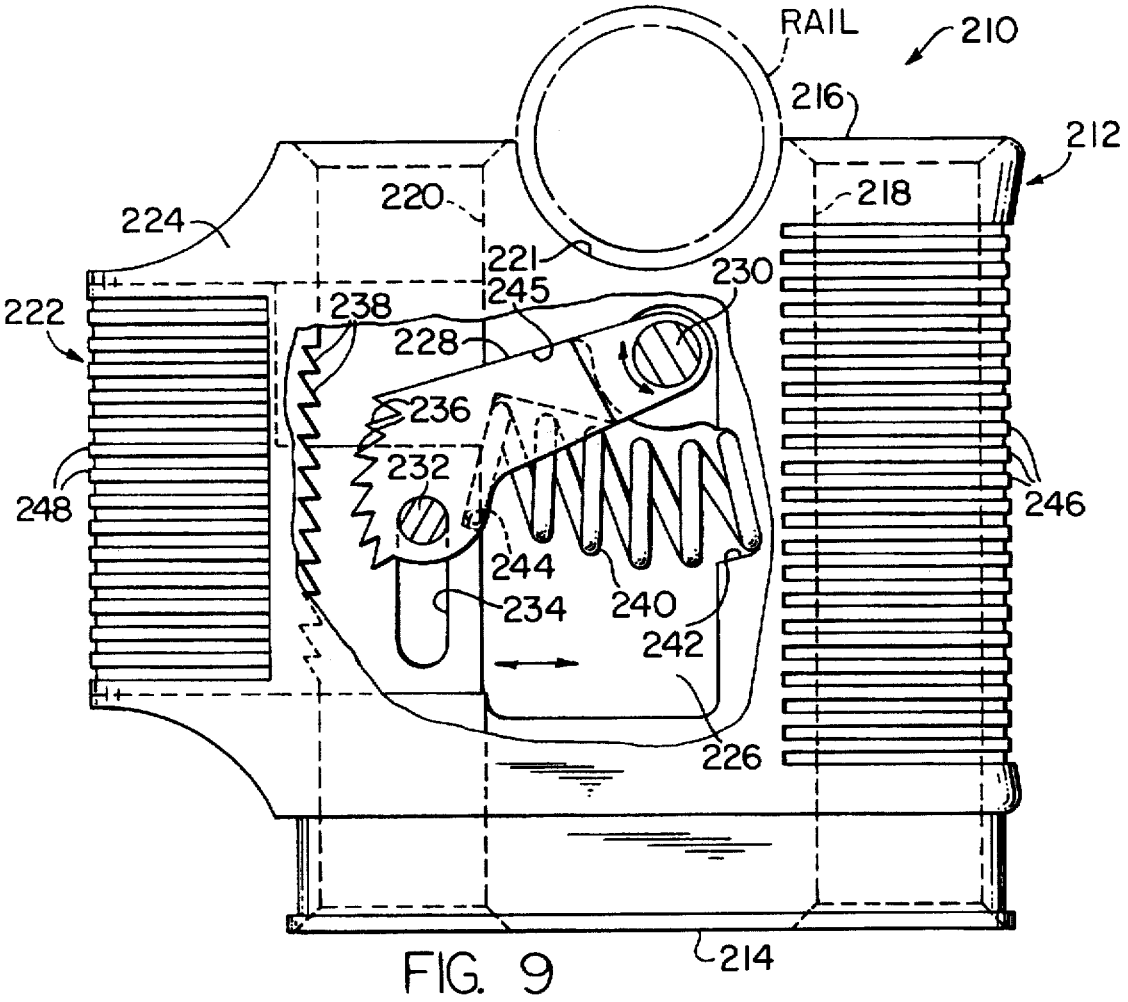
FIG. 9 is a side plan view, in partial cross-section, of another apparatus embodying the present invention for fastening and adjusting a line supporting a fender on a marine vessel.
Figure 10:
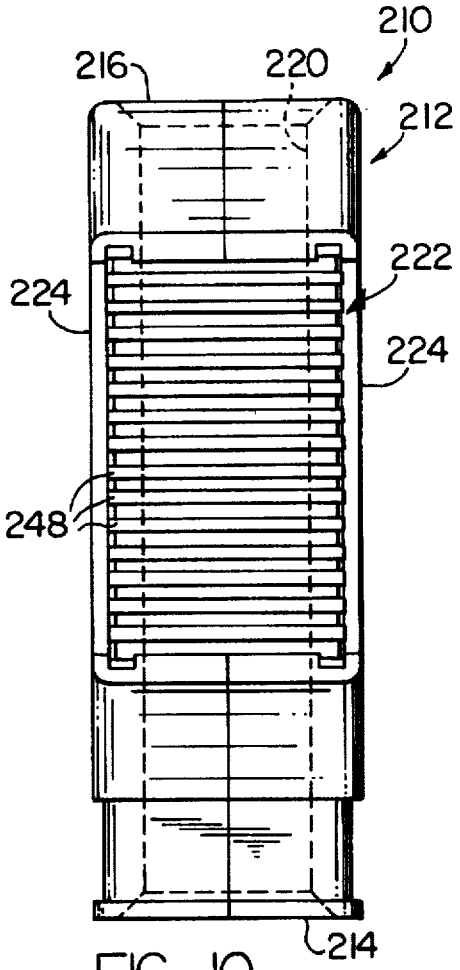
FIG. 10 is a left end, plan view of the apparatus of FIG. 9.
Figure 11:
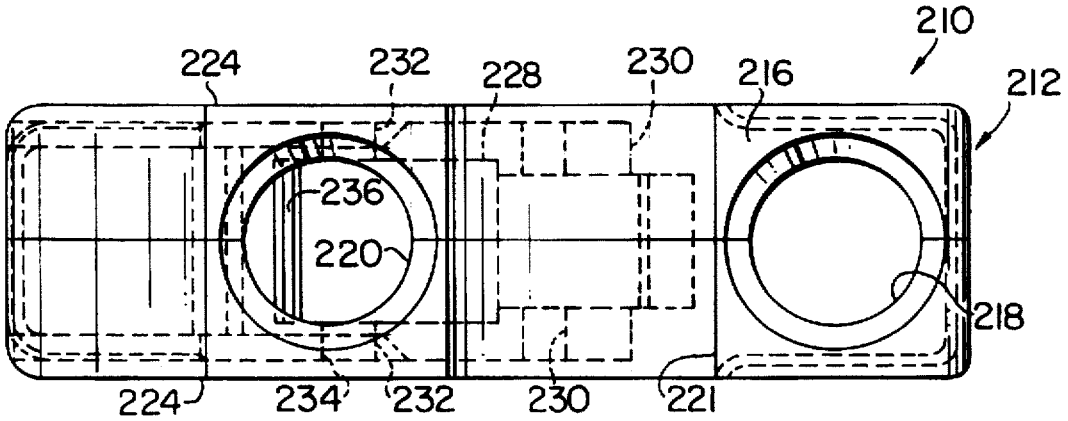
FIG. 11 is a top plan view of the apparatus of FIG. 9.

In FIGS. 9–11, another embodiment of the present invention is indicated generally by the reference numeral 210. The apparatus 210 includes a body portion 212 defining a first end surface 214, and a second end surface 216 on the opposite side of the body portion relative to the first end surface. The body portion 212 also defines a generally cylindrical first bore 218 extending through the body portion between the first and second end surfaces 214 and 216, respectively, and a generally cylindrical second bore 220 also extending through the body portion between the first and second end surfaces, and spaced apart from the first bore 218, as illustrated in dashed lines in FIG. 9. A semi-circular cutout 221 is formed in the second end surface 216 between the first and second bores 218 and 220, respectively, for receiving a rail or other similar-shaped structure, as illustrated in dashed lines in FIG. 9.

A handle portion 222 is mounted on one side of the body portion 212 and defines a generally U-shaped cross-section for receiving one end of the body portion between opposing side walls 224. The body portion 212 defines a chamber 226 within a central portion of the body portion between the first and second bores 218 and 220, respectively, and one side of the chamber 226 is in communication with the second bore 220. A lever or drive arm 228 is pivotally mounted on one end to the body portion 212 by a pair of first pivot pins 230 projecting outward from opposite sides of the drive arm relative to each other, and received within corresponding recesses (not shown) formed within the body portion 212. The other end of the drive arm 228 is coupled to the handle portion 222 by a pair of second pivot pins 232 projecting outward on opposite sides of the drive arm relative to each other, and received within elongated apertures 234 formed through the side walls 224 of the handle portion 222.

As shown in FIG. 9, an end portion of the drive arm 228 received within the second bore 220 defines a plurality of teeth 236 projecting into the second bore and oriented generally downward in FIG. 9 toward one end of the second bore. The side wall defining the second bore 220 facing the drive arm 228 also defines a plurality of teeth 238 located opposite the drive arm and facing the teeth 236. As shown in FIG. 9, the teeth 238, like the teeth 236, are preferably shaped to point generally downward in the FIG. (a saw-tooth shape) toward the same end of the first bore 220 as are the teeth 236.

A coil spring 240 is coupled between the drive arm 228 and the body portion 212 and normally biases the end of the drive arm defining the teeth 236 toward the first bore 220. One end of the coil spring 240 is received within a generally cylindrical recess 242 formed within the body portion on one side of the chamber 226, and the other end of the coil spring is received within another generally cylindrical recess 244 formed within a side wall of the drive arm 228 and generally facing the other recess 242, as shown in dashed lines in FIG. 9. A stop surface 245 defines a top wall of the chamber 226, and engages a top surface of the drive arm 228 to prevent the teeth 236 of the drive arm from engaging the teeth 238 when there is no line within the second bore 220, as shown in FIG. 9. The position and shape of the stop surface 245 is selected to adjust the throw of the drive arm 228.

A plurality of ribs 246 are formed on one side of the body portion 212, and are spaced apart from each other along the respective side of the body portion, and a plurality of ribs 248 are formed on one side of the handle portion 222 on the opposite side of the apparatus relative to the ribs 246 and are spaced apart from each other along the side of the handle portion. The ribs 246 and 248 facilitate a user's ability to grip the apparatus 210 during operation to move the handle portion 222 relative to the body portion 212, and in turn move the drive arm 228 to open or close the passageway through the second bore 220, as is hereinafter described.

In the operation of the apparatus 210, a line is received and fed through the bottom of the first bore 218, wrapped over the rail (or other structure from which the line and apparatus are suspended), and received and fed through the top of the second bore 220. In order to feed the line through the second bore 220, the operator squeezes the handle portion 222 toward the body portion 212, which in turn drives the lever or drive arm 228 to pivot downward about the first pivot pins 230 against the coil spring 240, as indicated by the arrows in FIG. 9. As the drive arm 228 is pivoted against the coil spring 240, the coil spring is compressed, the second pivot pins 232 are moved downward in FIG. 9 through the elongated slots 234, and the end of the drive arm 228 defining the teeth 236 is rotated away from the second bore 220, thus opening a passageway through the second bore to receive the line through the second bore.

Once a desired length of the line is passed through the second bore 220, the operator releases the pressure applied to the handle portion 222, and the coil spring 240 then drives the lever or drive arm 228 to pivot upward in FIG. 9 toward the second bore 220, which in turn drives the teeth 236 into engagement with one side of the line, thus pressing the opposite side of the line into engagement with the teeth 238 to lock the line in place. If the weight of the fender pulls the line upward in the second bore 220, the teeth engage the line and lock the line in place, thus preventing the line from moving from its locked position within the second bore 220 and maintaining the fender in place. The generally downward-pointed or saw-tooth shape of the teeth 236 and 238 facilitates the ability of the teeth to lock the line in place if the line is pulled upward in the second bore 220. As the line is pulled downward in the first bore 218 and in turn upward in the second bore 220, the teeth 236 and 238 are drawn into deeper engagement with the line. Generally, the greater the force that is applied to pull the line downward in the first bore 218, the greater is the locking force of the drive arm 228 against the line.

This can be a significant advantage when there are waves or rough water conditions that might cause the fender to bounce or move around, because the apparatus of the present invention locks the line in place by engaging the line between the teeth of the spring-biased lever or drive arm and the teeth formed along the wall defining the second bore. The force applied by the drive arm to the line, and thus the locking force of the apparatus on the line, is selected by selecting the size of the coil spring and/or by selecting the spring constant, and/or the size, shape and orientation of the teeth formed on the drive arm and within the second bore. The larger the spring and/or the spring constant, the greater is the force applied to the drive arm to engage the drive arm against the line. Similarly, the downward-pointed shape of the teeth formed on both the drive arm and the inside wall *of* the second bore, facilitates in maintaining the engagement of the teeth with the line and in preventing the line from slipping upward relative to the teeth.

As will be recognized by those skilled in the art, however, the teeth 236 and/or the teeth 238 can be formed with a less pointed shape or can be oriented perpendicular to the axis of the second bore (or less downward in the Figure). In this instance, the teeth may permit the line to slide through the second bore when the drive arm is engaged with the line if a sufficient force is applied to pull the line, yet the drive arm will normally grip the line and maintain the line in place when only the force due to the weight of the fender, for example, is applied to the line.

As will be recognized by those skilled in the art, numerous modifications can be made to the apparatus disclosed herein without departing from the spirit of the present invention and the scope of the appended claims. For example, the apparatus 210 may be constructed to accept any of numerous different types of modular attachment components as illustrated, for example, in FIGS. 5–7. In this case, the first bore 218 and cut-out 221 are formed within a modular attachment component as illustrated, for example, in FIG. 7, and the body portion 212 includes means for attaching the modular component as illustrated, for example, in FIG. 4. If modular attachment components as illustrated in FIGS. 5 and 6 are employed, and thus there is no first bore 218, the apparatus is used in an inverted configuration. In this instance, the line is fed in the opposite direction through the bore 220 than it is fed in the embodiment illustrated in FIGS. 9–11.

It is also noted that the apparatus of the present invention are adaptable for use with any size line, and likewise can be attached to nearly any structure on a vessel. The dimensions of the first and second bores can be selected to handle any size line, or a single dimension can be selected to handle a range of different size lines. Moreover, the bores do not have to be circular in shape, but rather may take an oval or other shape. Similarly, the cut-out in the top surface of the apparatus can be made in any shape or in any desired dimension for attachment to any size rail, or other different shaped structures. If desired, a larger size cut-out can be provided, and different size saddle members can be provided to seat within the cut-out, and thereby adjust the size of the cut-out to match a particular size rail, as indicated typically in dashed lines in FIG. 7. The saddle member can be fixed to the surface of the cut-out by means of a fastener or with a suitable adhesive.

Different biasing mechanisms can also be employed to bias the lever or drive arm, rather than the coil springs disclosed herein. In addition a flexible plastic drive arm may be employed, which is inherently biased into engagement with the line. It may also not be necessary to have a movable handle portion as disclosed herein, but rather one skilled in the art may employ another means coupled to the drive arm or lever to move the drive arm or lever relative to the body portion and/or the passageway receiving the line to selectively engage and disengage the line.

I claim:

1. An apparatus for fasting a line, comprising:

a body portion defining at least one passageway extending through the body portion for receiving a line;

a handle portion coupled to the body portion and movable relative to the body portion and defining at least one elongated slot; and a drive arm pivotally mounted on one end to the body portion and coupled on another end to the handle portion, the drive arm defining a line-engaging surface normally biased toward the passageway to engage a line extending through the passageway, and at least one drive surface received within the at least one elongated slot for movement of the drive surface through the elongated slot in response to movement of the handle portion relative to the body portion to move the drive arm between first and second positions, the drive arm being movable between a first position to one side of the passageway to permit movement of a line through the passageway in response to movement of the handle portion toward the body portion, and a second position at least approximately in the passageway to engage a line extending through the passageway upon movement of the handle portion away from the body portion.

2. An apparatus as defined in claim 1, further comprising at least one spring member coupled between the drive arm and the body portion for normally biasing the drive arm toward the second position.

3. An apparatus as defined in claim 1, wherein the body portion defines two passageways extending through the body portion and spaced apart from each other, and the second position is in one of the passageways.

4. An apparatus as defined in claim 1, wherein the line-engaging surface defines a plurality of raised surface areas and corresponding depressed surface areas for engaging a line extending through the at least one passageway with raised surface areas.

5. An apparatus as defined in claim 4, wherein a plurality of the raised surface areas are pointed and oriented generally toward one end of the at least one passageway.

6. An apparatus as defined in claim 1, wherein a surface defining the at least one passageway defines a plurality of raised surface areas and corresponding depressed surface areas for engaging a line extending through the at least one passageway with raised surface areas.

7. An apparatus as defined in claim 6, wherein a plurality of the raised surface areas are pointed generally toward one end of the at least one passageway.

8. An apparatus for fastening a line, comprising:

a body portion defining at least one passageway extending through the body portion for receiving a line;

a handle portion coupled to the body portion and movable relative to the body portion; and a drive arm pivotally mounted on one end to the body portion and coupled on another end to the handle portion, the drive arm defining a line-engaging surface normally biased toward the passageway to engage a line extending through the passageway, and movable between a first position to one side of the passageway to permit movement of a line through the passageway in response to movement of the handle portion toward the body portion, and a second position at least approximately in the passageway to engage a line extending through the passageway upon movement of the handle portion away from the body portion, wherein the drive arm includes two drive surfaces located on opposite sides of the drive arm relative to each other, and the handle portion includes two elongated slots located on opposite sides of the handle portion relative to each other, and each elongated slot receives a respective drive surface for movement of the drive surfaces through the elongated slots in response to movement of the handle portion relative to the body portion to move the drive arm between the first and second positions.

9. An apparatus for fastening a line [supporting a fender and suspending the fender arm from] *to* a fixture [on a marine vessel], comprising:

a body [portion] including means for forming a *closed* loop with the line [external of the apparatus and] surrounding at least a portion of the fixture for supporting the apparatus against the fixture, *said means* including a first unobstructed passageway formed through the body [portion] for receiving the line through the body [portion], [and] a second passageway spaced apart from the first passageway and formed through the body [portion] for receiving the line passed through the first passageway and forming a loop with the line between the first and second passageways, *and a portion of the body extending between the first and second passageways for closing the loop with the line* surrounding at least a portion of the fixture; *and* means for engaging *the portion of* the line extending through the second passageway and fixing the line within the second passageway [to fix the position of the fender suspended from the fixture, and means for engaging being movable between first and second positions, the first position being located to one side of the second passageway to permit movement of the line through the second passageway, and the second position being at least partially within the second passageway to engage the line within the second passageway and fix the line within the second passageway; and] *for securing the apparatus and the line to the fixture*

[a support surface defined between the first and second passageways of the body portion for engagement with a surface on the fixture to support the apparatus against the fixture].

10. An apparatus for fastening a line *to a fixture*, comprising:

a body [portion] including means for forming a *closed* loop with the line [external of the body portion] *and surrounding at least a portion of the fixture for fastening the line to the fixture, said means* including a first [unobstructed] passageway extending through the body [portion] for receiving [the] *a* line, [and] a second passageway spaced apart from the first passageway extending through the body [portion] for receiving the line after it is passed through the first passageway and forming a loop with the line between the first and second passageways, and [external of the body portion] *a portion of the body extending between the first and second passageways for closing the loop with the line surrounding at least a portion of the fixture*;

a handle portion coupled to the body [portion]; and a line-engaging portion pivotally mounted to the body [portion] and coupled to the handle portion[, and means for normally biasing the line engaging portion toward a second position into engagement with the line extending through the second passageway to fix the line in the second passageway, and] *for movement of the line-engaging portion in response to movement of the handle portion,* wherein the line-engaging portion is movable [from the] *into a* second position [to a first position away from the second passageway to permit passage of the line through the second passageway upon movement of the handle portion toward the body portion] *into engagement with the line extending through the second passageway to fix the line in the second passageway and thereby secure the line to the fixture,*

*and wherein the line-engaging portion is movable from the second position to a first position away from the second passageway to permit passage of the line through the second passageway to release the line from the fixture.*

11. An apparatus as defined in claim 10, wherein the handle portion is integral with the line-engaging portion and is pivotally mounted to the body [portion], and at least a portion of the second passageway is defined between the line-engaging portion and the body [portion].

12. An apparatus as defined in claim 11, wherein a biasing member is coupled between the handle portion and the body [portion] for normally biasing the line-engaging portion toward the second position.

13. An apparatus as defined in claim 10, wherein the line-engaging portion defines a plurality of raised surface areas and corresponding depressed surface areas for engaging a line extending through the second passageway with the raised surface areas to fix the line in the second passageway.

14. An apparatus as defined in claim 13, wherein a plurality of the raised surface areas are tapered and pointed generally toward one end of the second passageway.

15. An apparatus as defined in claim 10, wherein a surface defining the second passageway defines a plurality of raised surface areas and corresponding depressed surface areas between raised surface areas for engaging a line extending through the second passageway with raised surface areas.

16. An apparatus as defined in claim 15, wherein the raised surface areas are tapered and pointed generally toward one end of the second passageway.

17. An apparatus as defined in claim 10, wherein the line-engaging portion includes at least one drive member and the handle portion defines at least one elongated slot for receiving the drive member for slidable movement of the drive member through the elongated slot with movement of the line-engaging portion between the first and second positions.

18. An apparatus as defined in claim 10, wherein the body [portion] *further* defines a recess located between the first and second passageways for receiving a fixture on a vessel to support the apparatus against the fixture.

19. An apparatus as defined in claim 10, wherein the body [portion] includes a first part, a second part, and means for detaching the first part from the second part, and wherein the second part defines a modular attachment component defining the first [bore] *passageway*.

20. An apparatus as defined in claim 19, wherein the means for detaching includes a recess defined by one of the first part and the second part of the body [portion], and an elongated raised portion defined by the other of the first part and the second part received within the recess for coupling the first part to the second part.

21. An apparatus for fastening a line, comprising:

a body portion defining a first passageway extending through the body portion for receiving the line, and a second passageway spaced apart from the first passageway extending through the body portion for receiving the line passed through the first passageway;

a handle portion coupled to the body portion; and a line-engaging portion pivotally mounted to the body portion and coupled to the handle portion, and normally biased toward a second position into engagement with the line extending through the second passageway to fix the line in the second passageway, and movable from the second position to a first position away from the second passageway to permit passage of the line through the second passageway upon movement of the handle portion toward the body portion, wherein the line-engaging portion includes two drive members located on opposite sides of the line-engaging portion relative to each other, and the handle portion includes two elongated slots located on opposite sides of the handle portion relative to each other, and each elongated slot receives a respective drive member for slidable movement of the drive members through the elongated slots with movement of the line-engaging portion between the first and second positions.

22. An apparatus for fastening a line, comprising:

a body portion defining a first passageway extending through the body portion for receiving the line, and a second passageway spaced apart from the first passageway extending through the body portion for receiving the line passed through the first passageway;

a handle portion coupled to the body portion; and a line-engaging portion pivotally mounted to the body portion and coupled to the handle portion, and normally biased toward a second position into engagement with the line extending through the second passageway to fix the line in the second passageway, and movable from the second position to a first position away from the second passageway to permit passage of the line through the second passageway upon movement of the handle portion toward the body portion, wherein the body portion includes a first part, a second part, and means for detaching the first part from the second part, and wherein the second part defines a modular attachment component defining the first passageway, and the means for detaching includes a recess defined by one of the first part and the second part of the body portion, and an elongated raised portion defined by the other of the first part and the second part received within the recess for coupling the first part to the second part, and wherein the elongated raised portion defines at least one tapered wall and the recess is defined by at least one corresponding tapered wall for securing the raised portion within the recess.

23. An apparatus for fastening a line, comprising:

a body portion including means for forming a loop with a line external of the body portion, including a first unobstructed aperture extending through the body portion for receiving a line, and a second aperture spaced apart from the first aperture and extending through the body portion for receiving the line after it is received through the first aperture and forming a loop within the line between the first and second apertures;

a handle portion coupled to the body portion and movable relative to the body portion; and means coupled to the handle portion and to the body portion for engaging the line received within the second aperture to secure the line within the second aperture upon movement of the handle portion away from the body portion, and for releasing the line upon movement of the handle portion toward the body portion to permit passage of the line through the second aperture.

24. An apparatus as defined in claim 23, wherein the means for engaging the line includes a drive arm pivotally coupled on one end to the body portion, defining at least one drive surface on another end coupled to the handle portion for movement with the handle portion toward and away from the body portion, and defining a line-engaging surface for engaging a line received within the second aperture with movement of the handle portion away from the body portion.

25. An apparatus as defined in claim 24, further comprising a biasing member coupled between the drive arm and the body portion for biasing the drive arm toward the second aperture and biasing the handle portion away from the body portion.

26. An apparatus as defined in claim 23, wherein the means for engaging the line includes a drive arm pivotally coupled to the body portion and integral with the handle portion, and defining a line-engaging surface for engaging the line upon movement of the handle portion away from the body portion to secure the line within the second aperture, and for releasing the line upon movement of the handle portion toward the body portion for passage of the line through the second aperture.

27. An apparatus as defined in claim 26, further comprising a biasing member coupled between the handle portion and the body portion for biasing the handle portion away from the body portion and simultaneously biasing the line-engaging surface toward the second aperture.

*28. An apparatus as defined in claim 9, wherein the means for engaging is movable between first and second positions, the first position being located to one side of the second passageway to permit movement of the line through the second passageway, and the second position being at least partially within the second passageway to engage the line within the second passageway and fix the line within the second passageway.*

*29. An apparatus as defined in claim 28, wherein the portion of the body extending between the first and second passageways defines a support surface for engagement with a surface on the fixture to support the apparatus against the fixture.*

*30. An apparatus as defined in claim 9, wherein the means for engaging is defined by a plurality of line-engaging surfaces spaced relative to each other and extending into the second passageway for engaging and fixing the portion of the line within the second passageway.*

*31. An apparatus as defined in claim 9, further comprising a line defining a first end, and a second end adapted to be connected to a load for supporting the load from the fixture, wherein the first end of the line is received through the first passageway and in turn through the second passageway to thereby form the closed loop with the line surrounding at least a portion of the fixture, and the second end of the line hangs from the first passageway for connection to the load to support the load from the fixture.*

*32. An apparatus as defined in claim 10, further comprising means for biasing the line-engaging portion toward the second position into engagement with the portion of the line extending through the second passageway to fix the line in the second passageway and thereby secure the line to the fixture, and wherein the line-engaging portion is movable from the second position to the first position upon movement of the handle portion toward the body portion.*

*33. An apparatus for fastening a line to a fixture, comprising:*

*a body defining first and second passageways for receiving the line and forming a closed loop with the line surrounding at least a portion of the fixture, wherein the first passageway defines an unobstructed space through the body for receiving a portion of the line and permitting the line to move freely therethrough, and the second passageway is spaced apart from the first passageway for receiving another portion of the line and forming the loop, and wherein the body further defines a portion extending between the first and second passageways and closing the loop with the line surrounding at least a portion of the fixture; and*

*a line-engaging surface extending into the second passageway for engaging and fixing the portion of the line within the second passageway to thereby fasten the line to the fixture.*

*34. An apparatus as defined in claim 33, wherein the portion of the body extending between the first and second passageways defines a support surface for engaging the*

*fixture and supporting the apparatus against the fixture, and the second passageway includes a first end located adjacent to the support surface and a second end spaced away from the support surface, and the line-engaging surface is defined by a plurality of raised surface areas, each extending in a direction generally away from the first end and approximately toward the second end of the second passageway to facilitate engagement of the line within the second passageway when the line is pulled in the direction from the second passageway toward and into the first passageway.*

*35. An apparatus as defined in claim 33, further comprising a line defining a first end, and a second end adapted to be connected to a load to support the load from the fixture, wherein the first end of the line is received through the first passageway and in turn through the second passageway to thereby form the closed loop with the line surrounding at least a portion of the fixture, and the second end of the line hangs from the first passageway for connection to the load to support the load from the fixture.*

*36. An apparatus as defined in claim 35, wherein the load is a fender for a marine vessel.*

*37. An apparatus as defined in claim 35, wherein at least one of the line and line-engaging surface is movable relative to the other within the second passageway to engage and fix the line within the second passageway.*

*38. An apparatus as defined in claim 37, wherein the line-engaging surface comprises a plurality of raised surface areas spaced relative to each other and extending into the second passageway.*

*39. An apparatus as defined in claim 33, further comprising a clip coupled to the body for attachment of the apparatus to the fixture.*

*40. An apparatus as defined in claim 35, wherein the line defines a knot formed therein for engaging the body and preventing passage of the line in the direction from the second passageway into the first passageway.*

* * * * *